June 30, 1925. 1,544,020
H. R. MADDOX ET AL
SIGNALING DEVICE
Filed March 10, 1923  2 Sheets-Sheet 1
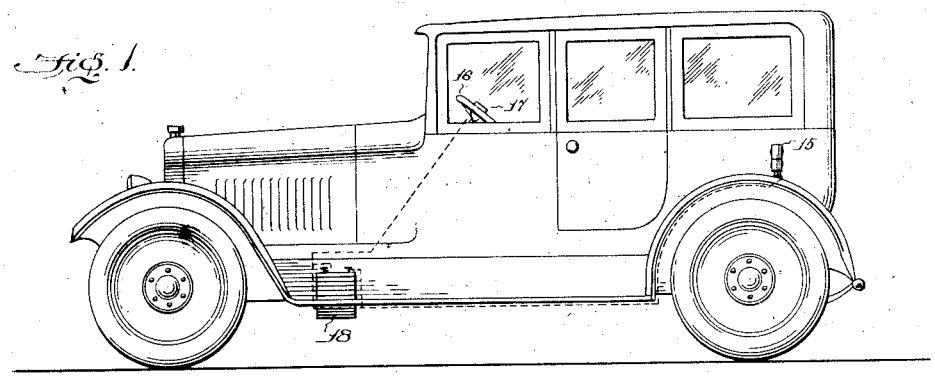
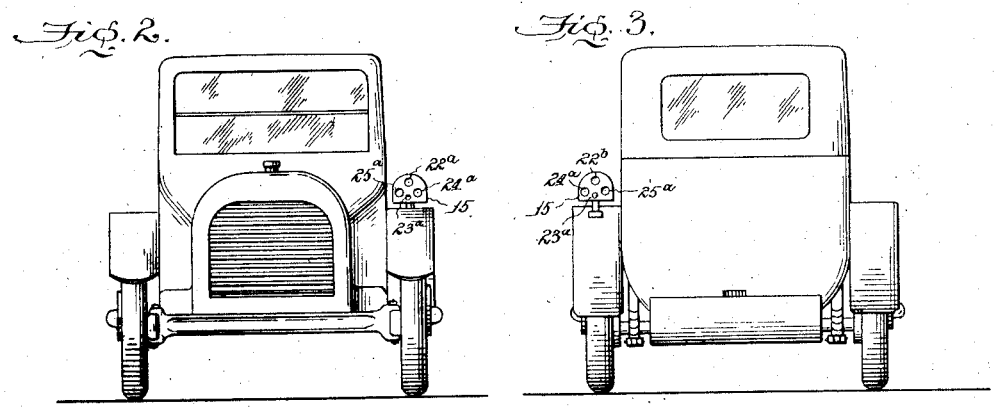
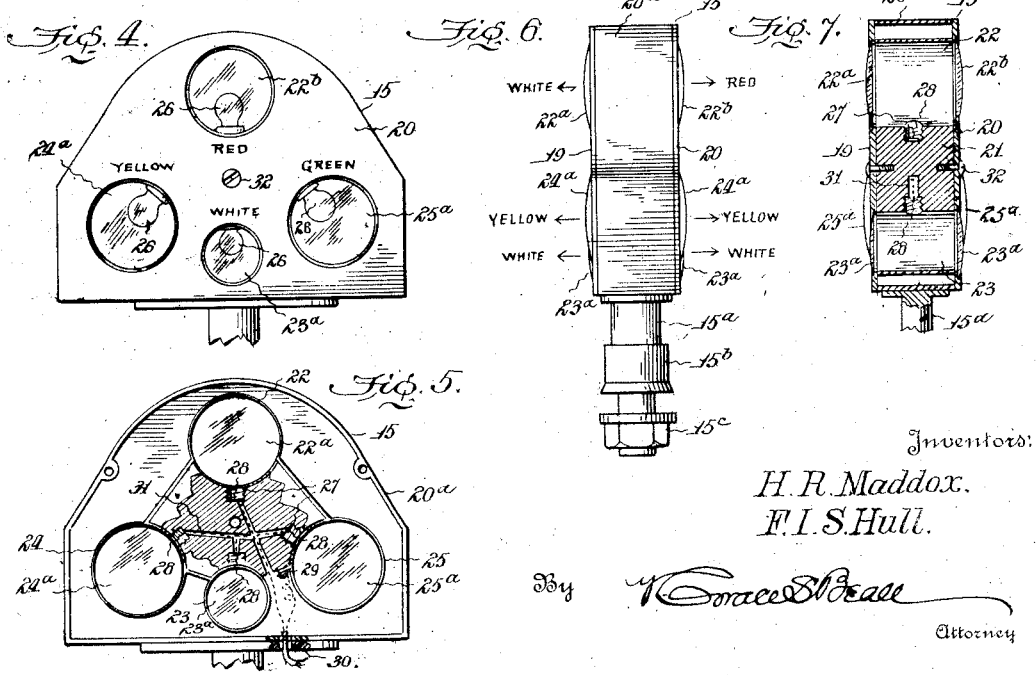
Inventors:
H. R. Maddox.
F. I. S. Hull.
By Grace B. Beall
Attorney June 30, 1925.  
H. R. MADDOX ET AL  
SIGNALING DEVICE  
Filed March 10, 1923
1,544,020
2 Sheets-Sheet 2
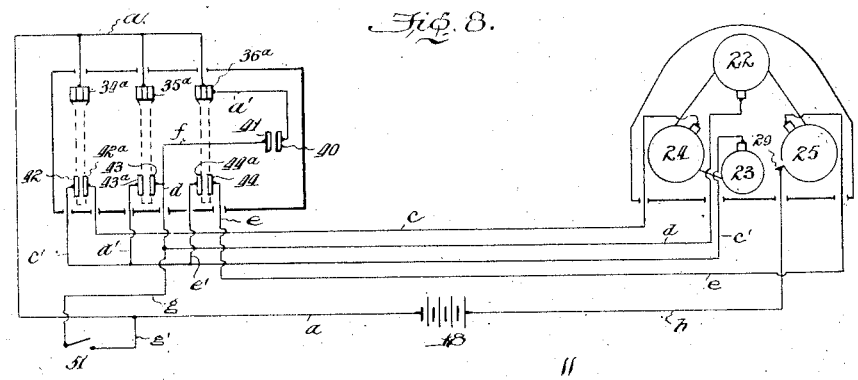
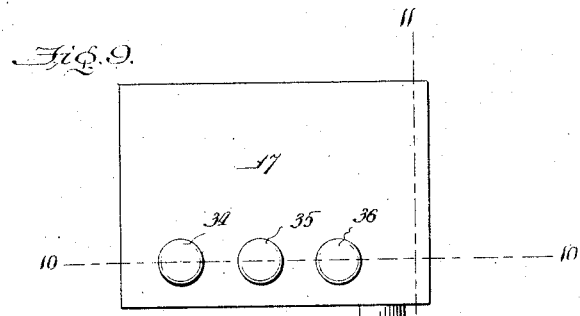
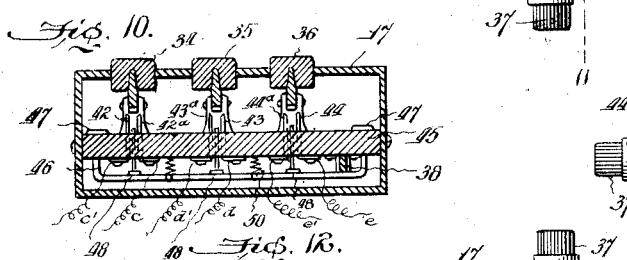
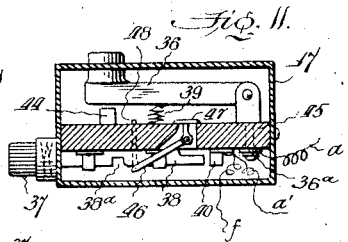
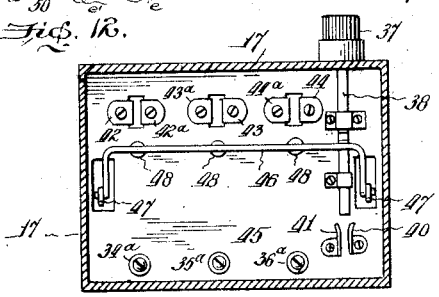
Inventors:  
H. R. Maddox.  
F. I. S. Hull.
By *[signature]*  
Attorney Patented June 30, 1925.

1,544,020

UNITED STATES PATENT OFFICE.

HENRY R. MADDOX AND FRANCIS I. S. HULL, OF RICHMOND, VIRGINIA.

SIGNALING DEVICE.

Application filed March 10, 1923. Serial No. 624,140.

*To all whom it may concern:*

Be it known that we, HENRY R. MADDOX and FRANCIS I. S. HULL, citizens of the United States, residing at Richmond, in the county of Henrico and State of Virginia, have invented a Signaling Device, of which the following is a specification.

Our invention is an improvement in signaling devices especially adapted for use in connection with the operation of automobiles, and relates to an arrangement of different colored electric-lights and connections therefor including a switch-box conveniently located with respect to the driver for controlling the lights.

The primary object of our invention is to provide a signaling arrangement which will insure a greater measure of safety in driving automobiles about the streets of a city and on other highways, comprising in the present instance a signal lamp containing electric-lights and having glass covered openings in the front and rear thereof to show different colored lights for the purpose of signaling to an automobile approaching from either direction the intentions of the driver of the automobile provided with said signal lamp with respect to the operation of his automobile—as to whether it will be turned to the right or left, slowed up, stopped, &c.—the electric-lights in the signal lamp being under the control of the driver through the medium of a switch-box especially adapted for turning them off and on independently and for automatically tripping the switches to a normal position.

In the following specifications we have described the construction and operation of our invention, as illustrated in the accompanying drawings, and what we particularly claim as new in the arrangement and cooperation of parts is more specifically set forth in the appended claims.

In the drawings:

Fig. 1 is a front elevation of an automobile showing the application of our signaling device thereto.

Figs. 2 and 3 are front and rear views thereof, respectively.

Fig. 4 is an enlarged front elevation of the signal-lamp.

Fig. 5 is a front view thereof with the face plate removed and part of the core-block in section.

Fig. 6 is a side view of said lamp.

Fig. 7 is a vertical sectional view.

Fig. 8 is a diagrammatic view showing the electric connections from the battery to the signal-lamp and to the switch-box, with an auxiliary circuit through a make and break device hereinafter referred to.

Fig. 9 is a detail plan view of the switch-box.

Figs. 10 and 11 are sectional views through the switch-box on the lines 10—10 and 11—11, respectively, of Fig. 9.

Fig. 12 is an inverted plan view with the bottom of the box removed.

In carrying out our invention a lamp 15 of special construction is mounted on the rear fender at the left-hand side of the automobile and provided with glass covered openings in the front and rear face-plates thereof through which the lights are projected, the lamp being above the horizontal plane of the fenders to be visible to automobiles approaching in opposite directions, and in connection with this lamp there is located convenient to the driver of the automobile, as for instance on the steering-wheel 16, a switch-box 17 connected by suitable wiring to said lamp and to a source of electric current, as storage battery 18, to complete the required circuits from the storage battery through the electric-lights in the lamp, whereby said lights may be turned on and off independently or in combination for the purpose of displaying the desired signals contemplated by the invention.

The body of the lamp 15 is box-shape, preferably of the configuration shown in the drawings, and consists of opposite face-plates 19 and 20 suitably spaced apart by a circumferential rim 20ª and containing a core-block 21 around which are located horizontal cylinders confining the electric-lights, one of said cylinders 22 being at the center of the upper part of the lamp body, another 23 below the same near the bottom of said lamp body and two others 24 and 25 at opposite sides on a horizontal plane intermediate the cylinders 22 and 23. Glasses are placed in the ends of the cylinders, being preferably attached to the face-plates so as to be removable therewith and some of these glasses are colored to increase the effectiveness of the signal lights; for instance the glass 22ª at the front end of cylinder 22 is plain to give a white light while the glass 22ᵇ at the other end thereof is colored red, and to cooperate with these lights for signaling in the manner hereinafter described the glasses 23ª 23ª at the ends of cylinder 23 are plain, those at the ends of cylinder 24, designated 24ª 24ª, are colored yellow and those at the ends of cylinder 25, designated 25ª 25ª are colored green, but it will be understood of course that other colors may be used if preferred. Each cylinder contains an electric light 26, the light or bulb in each instance being screwed into a socket 27 having a contact plate 28 at the bottom thereof to which the wire from one side of the battery is connected and the circuit is completed to the other side of said battery through the metal cylinders which for the purpose are connected together as shown in Fig. 5, the usual connection for the wire from the battery, as screw 29, being located convenient to opening 30 through the bottom of the box to receive the cable carrying the several wires to said screw connection 29 and to the contact-pieces in the light-sockets 27. For leading the wires to the different contact-pieces, as indicated in dotted lines Fig. 5 the core-block is recessed at 31, and for the purpose of attaching the face-plates 19 and 20 to said core-block supplementing their attachment to the lamp body there are holes in the opposite sides of the core-block at the center thereof to receive screws 32.

In connection with the signal lamp described we employ a special form of switch-box 33 having three switch-levers 34, 35 and 36 pivoted therein with operating keys or buttons at their free ends projecting through the top of the box, in connection with a co-operating spring-actuated push-button 37 in the front of the box operating a slidable switch-member or blade 38. The several electric switches referred to are of the conventional knife-blade type, the levers 34, 35 and 36 being connected at their pivot ends 34ª, 35ª and 36ª to a wire $a$ leading from one side of battery 18 (Fig. 8), and likewise one of the contact pieces 40 between which the slidable plate 38 operates is connected to said lead wire $a$ by a short wire $a'$, the companion contact piece 41 being wired to one of the lights in the signal lamp, as hereinafter explained. The switch-levers are moved to a normal open-circuit position by springs 39, and the blade 38 is also moved to open-circuit position by a spring located in the push-button 37 as indicated in dotted lines Fig. 11.

Each switch-lever in completing a circuit or circuits operates between two contact pieces as usual in this type of electric-switch, and in the present instance the operation of any one of the levers completes the circuit to two lights in the signal lamp for carrying out the code of signals hereinafter explained. To this end plates 42 42ª receiving lever 34 at the left are connected by wires $c$ $c'$ to the contact-pieces in the lamp-sockets of cylinders 24 and 23 respectively; plates 43 43ª receiving the central switch-lever 35 are connected to the lamp-sockets 22 and 23, and plates 44 44ª receiving the lever at the right of the switch-box are connected by wires $e$ $e'$ to the lamp-sockets in cylinders 25 and 23. It will be noted that each switch, 34, 35 and 36 operates the light in cylinder 23 in conjunction with a light in one of the other cylinders, and that this light serves to indicate the position of the other lights with relation thereto whereby it is not so important that colored lights be employed and to increase the effectiveness of this location light it is comparatively small. The push-button at the front of the switch-box operates between the contact pieces or plates 40 and 41 connected to wire $a$, as hereinbefore stated, and by wire $f$ to the wire $d$ which leads to the lamp-socket in cylinder 22, whereby this push-button operates only a single light. Connection from screw or binding-post 29 to battery is by wire $h$.

As ordinarily practiced a parking light is red to the rear and white to the front, contemplated in the present instance by the upper light in the signal-lamp 15, and as this light is turned on and off independently by push-button 37 we provide for locking said push-button in closed-circuit position, in the present instance by providing the lower edge of blade 38 with a notch 38ª into which is drawn a transverse rod 46 having crank-ends by which it is supported in ears 47, said crank-rod being actuated to normally engage the underside of the push-button slide 38 by springs 49. As will be noted the mechanism contained in the switch-box is all carried by a horizontal plate 45 of insulating material secured to the sides and ends of the box by screws leaving spaces for the operating parts above and below said plate, and that the latter is cut away or recessed to receive the ends of the engaging-rod 46. Now in order to automatically disengage the rod 46 on the operation of any one of the switch-levers 34, 35 and 36 releasing pins 38, one for each lever, rest on said rod passing upwardly therefrom through openings therefor in plate 45 so that their upper ends will be in vertical line with the several levers respectively.

Any suitable means may be provided for attaching the switch-box to the steering-wheel or other part of the automobile convenient to the driver; and likewise the signal lamp may be secured to the fender in any manner desired, the arrangement shown consisting of a short post 15 with an integral collar 15ᵇ below which said post is reduced in diameter and threaded to receive a clamping nut 15ᶜ.

The arrangement shown and described including the signal lamp, switch-box and electric connection to the battery is especially adapted to give a code of signals expressing the intentions of the driver of the automobile—as to whether he is going to proceed forward or backward, turn to the right or left, slow up or stop—for instance if the automobile is to proceed forwardly the electric-switch mechanism will be in normal position with open circuits thus showing no light from which an automobile approaching in either direction will understand that the automobile provided with the signal lamp is to proceed on its way in a direct line; if a turn to the right is to be made location or pilot-light 23ª and green light 25ª will be simultaneously lighted by depressing switch-lever 36 at the right of the switch-box, or if a turn is to be made to the left switch-lever 34 is depressed displaying the pilot-light 23ª and yellow light 24ª. To signal that the driver is to slow up and stop the automobile the intermediate push-button or switch-lever 35 is depressed displaying both the pilot-light 23ª and light in the cylinder 22, the latter showing red to the rear and white to the front, whereby the driver of an automobile approaching from the rear would see the combination red and white light while the driver of an automobile approaching from the front would see two white lights one in direct line above the other. The usual signal for indicating that the automobile is parked is displayed by operating the push-button 37 at the front of the switch-box thus showing but a single light front and rear—white to the front and red to the rear—and to maintain this signal without holding the push-button it is locked automatically by the spring-actuated crank-rod 46 engaging therewith. Of course in starting up the automobile push-button 37 should be released by depressing any one of the switch-levers 34, 35 or 36 for the purpose, but should the driver neglect to do this the parking signal would be automatically cut out when one of the switch-levers is depressed before making a turn or signaling to stop. A signal for backing could be displayed by operating push-button 37 and switch-lever 35 in quick succession.

As heretofore stated it is not necessary to use colored lights, as the pilot-light 23 serves as a guide for locating the other lights, and by this arrangement the code of signals could be understood by one who is color-blind. However, we prefer to use colors to indicate turns to right and left as well as the conventional red to indicate stop to those approaching from the rear, but instead of yellow and green for the turning colors others may be employed.

We also propose to combine with our arrangement any approved make and break device operated automatically by the operation of the foot-lever applying the brakes, and this provision is indicated in Fig. 8 by the switch 51 connected to wire $a$ from one side of the battery and to wire $d$ leading to the lamp-socket in cylinder 22 to show a red light.

As will be readily seen from the foregoing description of the construction and operation of our devices for displaying several combinations of visible signals toward both the front and rear of the automobile carrying the signal lamp the particular construction of the switch-box cooperates with the arrangement of the lights in the lamp to not only correctly display the signals by the mere operation of one of the switches but provide also for a proper signal without requiring pilot-lights in sight of the driver as required by some signaling devices for a similar purpose to ours. Furthermore it will be appreciated that the particular construction and arrangement of devices herein shown and described provide for a positive and safe operation with but little effort on the part of the driver.

We claim:

1. A signaling device for automobiles combining a signal lamp having a plurality of electric lights arranged with relation to each other to display a variety of signals, a source of electric current, switch-levers with cooperating contact-plates electrically connected to the source of electric current and to the aforesaid signal lights, an independent connector and cooperating contact-plates connected to the source of electric current and to one of the signal lights which is used also as a parking light, a locking means engaging said connector to hold it in contact with the plates, and means for disengaging the locking means actuated on the operation of any one of the switch-levers.

2. In a signaling device for automobiles the combination with a signal lamp having a central lower light, a second light at a suitable distance above the same and opposite side lights on a plane intermediate the aforesaid lights, a source of electric current and wire connections for supplying current to the signal lights, of a switch comprising a series of switch-levers and cooperating contact-plates for opening and closing the circuits to the signal-lights, a slidable connector for opening and closing the circuit to one of the signal lights, which is used also as a parking light, spring-actuated means engaging the connector to hold the same in closed circuit position, and means for releasing the engaging means actuated on the operation of any one of the switch-levers.

3. In a signaling device for automobiles the combination with a signal lamp having a lower light, a light at a suitable distance above the same and opposite side lights, a source of electric current and wire connections to said signal lights; of a switch comprising a series of levers and cooperating contact-plates for controlling selective lights in signaling, a spring-actuated slidable connector and coöperating contact plates for independently controlling the circuit to one of said lights which is used also as a parking light, said connector having a notch in its under side, and a spring-actuated crank-rod extending under the switch levers and movable into engagement with the notch in the slidable connector to hold the latter in engagement with its coöperating contact plates whereby said crank rod is actuated to release the connector on the operation of any one of the switch-levers, for the purpose set forth.

HENRY R. MADDOX.
FRANCIS I. S. HULL.